UNITED STATES PATENT OFFICE.

ANSON G. BETTS, OF STOCKHOUSE, NORTH CAROLINA.

SEPARATING MINERALS BY FLOTATION.

1,286,922.　　　　Specification of Letters Patent.　　Patented Dec. 10, 1918.

No Drawing. Application filed August 14, 1914, Serial No. 856,755. Renewed June 1, 1918. Serial No. 237,835.

*To all whom it may concern:*

Be it known that I, ANSON G. BETTS, a citizen of the United States, residing at Stockhouse, county of Madison, and State of North Carolina, have invented certain new and useful Improvements in Separating Minerals by Flotation, of which the following is a full, clear, and exact description.

This invention is an improvement in methods of separating metals from their ores, the special object being to increase the percentage of recovery of the metal sulfids from the same, and incidentally to extract a portion of the valuable metal in solution.

In the particular processes to which my invention has reference, the separation of the metals from the gangue is effected partially or wholly by the flotation of the metallic particles on a body of water while the earthy particles or gangue are permitted to sink. This process may be carried out in many ways, but usually some preliminary treatment of the comminuted ore is resorted to in order to make the metal particles more buoyant. This in most of the prior processes has been done by the use of oil which is mixed with the material for the purpose of coating the metal particles and by the employment of some process which will disseminate through the water in which the ore is contained fine bubbles of air or gas which attach themselves to the metal and cause the same to float.

I have discovered that in case of such ores as contain metallic sulfids, for example, cuprous sulfid or "chalcocite", if the particles of sulfid be coated with an imperceptibly thin film of sulfur, they will have a much stronger affinity for the air bubbles, and for the oil also, in the event that the latter is used. A coating of spongy, sticky sulfur may be readily produced on the surface of particles of metallic sulfid minerals by adding to a body of water in which such materials are contained in a finely divided state any chemicals that will give the bath an oxidizing reaction, and then agitating the water and ore, with a flotation agent, such as oil. This decomposes the metallic sulfid on their surface, extracting traces of metal, and leaving a film or sulfur, which has a strong affinity for bubbles of air or gas and the oil, resulting in an increased buoyancy of the particles, which float to the surface and may be skimmed off. By this or similar processes a much larger extraction of metal by flotation may be secured.

Many chemicals may be used for this purpose, such as ferric sulfate, ferric chlorid, bleaching powder, chlorin or an acid having an oxidizing action. For copper ores, I prefer to use chlorin, as it will dissolve copper oxids in the presence of limestone, and will also dissolve the finest and most difficultly extractable cuprous sulfid, which may be recovered from the liquid of the bath, for example by precipitating the copper from the liquid, in the form of a sulfid, so that a practically perfect extraction of the metal may be secured.

In the process described, the chemical reactions taking place are probably as follows:

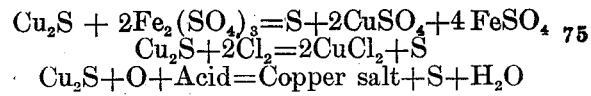

$$Cu_2S + 2Fe_2(SO_4)_3 = S + 2CuSO_4 + 4FeSO_4$$
$$Cu_2S + 2Cl_2 = 2CuCl_2 + S$$
$$Cu_2S + O + Acid = Copper\ salt + S + H_2O$$

In the event that the ores contain reducing substances such as siderite $FeCO_3$, a sufficient excess of oxidizing agent should be added to overcome the reducing action of such compound.

In the claims I mean to include under the term "flotation agent" any one, or more of the materials air, gases or oils.

What I claim is:

1. The process of treating ores containing metal sulfids, which comprises agitating the ore containing metal sulfid in a finely divided condition with an aqueous vehicle and a flotation agent, producing an oxidizing reaction in the bath by adding an oxidizing reagent thereto capable of producing films of free sulfur on the particles of metal sulfid, subjecting the treated ore to the action of a gas in finely divided form in the presence of said flotation agent and a liquid vehicle, in order to form a scum containing the major portion of the valuable metal sulfid.

2. A process of treating finely divided ores containing metal sulfid which comprises treating the same in a bath containing a flotation agent, adding an oxidizing agent capable of producing a film containing free sulfur upon the ore particles, and thereafter floating the ore particles.

3. A process of treating ores which comprises agitating a finely divided ore containing a metal sulfid, with a flotation agent and water containing in solution an oxidizing substance capable of reacting chemically with the sulfid, and producing films of sulfur on the particles of sulfid ore, subjecting the so treated ore to the action of a gas in the presence of said flotation agent, and a liquid vehicle, and removing the scum from the bath.

4. A method of treating ores which comprises agitating sulfid ore in a finely divided state with water containing chlorin gas in solution, and a flotation agent, separating the scum containing the ore particles from said water.

5. The herein described method of increasing the buoyancy of metal sulfids in finely divided ores, which comprises producing upon the particles of such sulfids by oxidation of a portion thereof, a thin film containing free sulfur to increase the affinity of the sulfid for bubbles.

In testimony whereof I affix my signature in the presence of two subscribing witnesses.

ANSON G. BETTS.

Witnesses:
THOMAS J. BYRNE,
WILLIAM P. JOHNSON.